(12) United States Patent
Akiyama (10) Patent No.: US 12,023,894 B2
(45) Date of Patent: *Jul. 2, 2024

(54) GLASS SHEET COMPOSITE (71) Applicant: AGC Inc., Tokyo (JP)

(72) Inventor: Jun Akiyama, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/815,334

(22) Filed: Jul. 27, 2022

(65) Prior Publication Data
US 2022/0363034 A1 Nov. 17, 2022

Related U.S. Application Data (60) Division of application No. 16/151,940, filed on Oct. 4, 2018, now Pat. No. 11,472,161, which is a
(Continued)

(30) Foreign Application Priority Data

Apr. 5, 2016 (JP) .................................. 2016-075928
Sep. 7, 2016 (JP) .................................. 2016-174801
Nov. 24, 2016 (JP) .................................. 2016-228372

(51) Int. Cl.
B32B 17/06 (2006.01)
B32B 7/12 (2006.01)
(Continued)

(52) U.S. Cl.
CPC ............... *B32B 17/06* (2013.01); *B32B 7/12* (2013.01); *B32B 11/04* (2013.01); *B32B 27/281* (2013.01);
(Continued)

(58) Field of Classification Search
None
See application file for complete search history.

(56) References Cited

U.S. PATENT DOCUMENTS 4,321,777 A * 3/1982 Sauret ............... B32B 17/10302
89/36.02
5,615,040 A * 3/1997 Watanabe ......... B32B 17/10568
349/182
(Continued)

FOREIGN PATENT DOCUMENTS

JP 1-185098 7/1989
JP 2-11131 U 1/1990
(Continued)

OTHER PUBLICATIONS

NSG Group, Technical Information, Properties of Soda-Lime-Silica Float Glass (Year: 2012).*
(Continued)

*Primary Examiner* — David Sample
(74) *Attorney, Agent, or Firm* — Oblon, McClelland, Maier & Neustadt, L.L.P.

(57) ABSTRACT

A glass sheet composite having two or more glass sheets and a liquid layer between at least a pair of glass sheets out of the glass sheets, wherein a thickness of the liquid layer is 1/10 or less of a total thickness of the pair of glass sheets when a total thickness of the pair of glass sheets is 1 mm or less, and 100 μm or less when the total thickness of the pair of glass sheets is more than 1 mm.

17 Claims, 7 Drawing Sheets

Related U.S. Application Data continuation of application No. PCT/JP2017/013683, filed on Mar. 31, 2017.

(51) Int. Cl.

| | |
|---|---|
| *B32B 11/04* | (2006.01) |
| *B32B 27/28* | (2006.01) |
| *B32B 27/30* | (2006.01) |
| *C03C 21/00* | (2006.01) |
| *C03C 27/06* | (2006.01) |
| *H04R 7/04* | (2006.01) |
| *H04R 7/06* | (2006.01) |
| *B32B 17/10* | (2006.01) |
| *C03C 3/087* | (2006.01) |

(52) U.S. Cl.
CPC ............. *B32B 27/30* (2013.01); *C03C 21/00* (2013.01); *C03C 27/06* (2013.01); *H04R 7/04* (2013.01); *H04R 7/06* (2013.01); *B32B 17/10* (2013.01); *B32B 17/10009* (2013.01); *B32B 17/10082* (2013.01); *B32B 17/10137* (2013.01); *B32B 17/10321* (2013.01); *B32B 17/1044* (2013.01); *B32B 2255/20* (2013.01); *B32B 2255/24* (2013.01); *B32B 2255/26* (2013.01); *B32B 2307/10* (2013.01); *B32B 2307/402* (2013.01); *B32B 2307/412* (2013.01); *B32B 2307/422* (2013.01); *B32B 2307/72* (2013.01); *B32B 2429/00* (2013.01); *B32B 2607/00* (2013.01); *C03C 3/087* (2013.01); *H04R 2307/023* (2013.01)

(56) References Cited

U.S. PATENT DOCUMENTS

| | | | | |
|---|---|---|---|---|
| 11,122,370 | B2* | 9/2021 | Akiyama | .......... B32B 17/10045 |
| 11,292,231 | B2* | 4/2022 | Sakurai | ................ C03C 27/06 |
| 11,472,161 | B2* | 10/2022 | Akiyama | ................ C03C 21/00 |
| 2006/0057312 | A1* | 3/2006 | Watanabe | ......... B32B 17/10486 |
| | | | | 428/34 |
| 2014/0341403 | A1* | 11/2014 | Booth | .................. H04R 31/003 |
| | | | | 381/190 |
| 2015/0086048 | A1 | 3/2015 | Brown et al. | |
| 2015/0132538 | A1* | 5/2015 | Cleary | ............. B32B 17/10137 |
| | | | | 428/141 |
| 2015/0309353 | A1* | 10/2015 | Stensvad | ............... B05C 5/0275 |
| | | | | 427/265 |
| 2018/0284328 | A1 | 10/2018 | Kawai | |
| 2019/0387322 | A1 | 12/2019 | Akiyama | |

FOREIGN PATENT DOCUMENTS

| | | |
|---|---|---|
| JP | 9-52738 A | 2/1997 |
| JP | 2015-65649 | 4/2015 |
| WO | WO 02/053369 A1 | 7/2002 |
| WO | WO 2014/061565 A1 | 4/2014 |
| WO | WO 2014/103678 A1 | 7/2014 |
| WO | WO 2015/156395 A1 | 10/2015 |
| WO | WO 2018/155518 A1 | 8/2018 |
| WO | WO 2018/181626 A1 | 10/2018 |

OTHER PUBLICATIONS

Industrial Coatings, Printing & Packaging Technical Data Sheet, BASF, Tinuvin® 171 (Year: 2019).*

535788 Sigma-Aldrich, 2-(2H-Benzotriazol-2-yl)-6-dodecyl-4-methylphenol (Year: 2023).*

International Search Report dated May 16, 2017 in PCT/JP2017/013683, filed on Mar. 31, 2017 (with English Translation).

Written Opinion dated May 16, 2017 in PCT/JP2017/013683, filed on Mar. 31, 2017.

Mal, O et al. "A Novel Glass Laminated Structure for Flat Panel Loudspeakers," AES 124th Convention, 2008, pp. 6.

Extended European Search Report dated Jun. 25, 2019, in Patent Application No. 17779061.5, 9 pages.

* cited by examiner

GLASS SHEET COMPOSITE

This application is a divisional of U.S. Ser. No. 16/151,940 filed Oct. 4, 2018, now U.S. Pat. No. 11,472,161, which is a continuation of PCT/JP2017/013683 filed Mar. 31, 2017 and claims the benefit of JP2016-228372 filed Nov. 24, 2016, JP2016-174801 filed Sep. 7, 2016 and JP2016-075928 filed Apr. 5, 2016.

TECHNICAL FIELD

The present invention relates to a glass sheet composite having good acoustic performance and also relates to a diaphragm, an opening member, and a glass substrate for magnetic recording mediums, each using the glass sheet composite.

BACKGROUND ART

Generally, a cone paper or resin has been used as a diaphragm for loudspeakers or microphones. Such a material has a high loss coefficient, making resonant vibration unlikely, and in turn, is regarded as having good sound reproduction performance in the audible range.

However, since the acoustic velocity is low in any of these materials, when the material is excited to vibrate at a high frequency, the vibration thereof is less likely to follow the acoustic wave frequency, and divided vibration is readily generated. It is therefore difficult to output a desired sound pressure particularly in a high-frequency range.

In recent years, the range required to be reproduced particularly for a high-resolution sound source, etc. is a high-frequency region of 20 kHz or more. This region is a range supposed to be poorly audible by human ear, but it is preferred that the sonic vibration in the range above can be reproduced with high fidelity, because a stronger emotional impact is presented, for example, a realistic sensation is felt strongly.

Accordingly, it may be conceived to use, in place of the cone paper or resin, a material having a high acoustic velocity propagating in the material, such as metal, ceramic and glass. However, in all of these materials, the loss coefficient is generally as small as approximately from $1/10$ to $1/100$ of that of paper and in turn, unintended reverberant sound is likely to remain. Furthermore, when a member is excited to vibrate at its intrinsic vibration frequency, conspicuous tonal degradation may occur due to generation of a resonant mode.

BACKGROUND ART DOCUMENTS

Non-Patent Literature

Non-Patent Literature 1: Olivier Mal et. al., "A Novel Glass Laminated Structure for Flat Panel Loudspeakers", AES Convention 124, 7343.

SUMMARY OF THE INVENTION

Problems That the Invention is to Solve

A laminated glass having a 0.5 mm-thick polybutyl polymer layer between two glass sheets is known as a diaphragm for loudspeakers (Non-Patent Document 1). However, reproduction in a high-frequency region has been difficult for this diaphragm.

An object of the present invention is to provide a glass sheet composite having good acoustic performance.

Means to Solve the Problems

As a result of many intensive studies, the present inventors have found that the problem above can be solved by constructing a predetermined glass sheet composite, and have accomplished the present invention.

<1> A glass sheet composite having a loss coefficient at 25° C. of $1 \times 10^{-2}$ or more and a longitudinal wave acoustic velocity in a sheet thickness direction of $5.5 \times 10^3$ m/s or more.

<2> The glass sheet composite according to <1>, including two or more glass sheets and a liquid layer between at least a pair of glass sheets out of the glass sheets.

<3> The glass sheet composite according to <2>, in which a thickness of the liquid layer is $1/10$ or less of a total thickness of the pair of glass sheets when the total thickness of the pair of glass sheets is 1 mm or less, and 100 μm or less when the total thickness of the pair of glass sheets is more than 1 mm.

<4> The glass sheet composite according to <2> or <3>, in which the liquid layer has a viscosity coefficient at 25° C. of $1 \times 10^{-4}$ to $1 \times 10^3$ Pa·s and a surface tension at 25° C. of 15 to 80 mN/m.

<5> The glass sheet composite according to any one of <2> to <4>, in which both of at least a pair of glass sheets out of all the glass sheets have a specific modulus of $2.5 \times 10^7$ m²/s² or more.

<6> The glass sheet composite according to any one of <2> to <5>, in which out of two glass sheets constituting the pair of glass sheets, denoting Qa and wa respectively as a resonant frequency and a half-width of resonance amplitude of one glass sheet A and denoting Qb and wb respectively as a resonant frequency and a half-width of resonance amplitude of the other glass sheet B, following relationship of [formula 1> is satisfied:

$$(wa+wb)/4 < |Qa-Qb| \quad \text{[formula 1]}$$

<7> The glass sheet composite according to any one of <2> to >6>, in which a mass ratio of two glass sheets constituting the pair of glass sheets is from 0.8 to 1.25.

<8> The glass sheet composite according to any one of <2> to <7>, in which a sheet thickness of each of two glass sheets constituting the pair of glass sheets is from 0.01 to 15 mm.

<9> The glass sheet composite according to any one of <2> to <8>, in which the liquid layer contains at least one member selected from the group consisting of propylene glycol, dimethyl silicone oil, methyl phenyl silicone oil, methyl hydrogen silicone oil, and denatured silicone oil.

<10> The glass sheet composite according to any one of <1> to <9>, including at least either one of physically strengthened glass sheet or chemically strengthened glass sheet.

<11> The glass sheet composite according to any one of <1> to <10>, in which a visible light transmittance is 60% or more.

<12> The glass sheet composite according to any one of <2> to <11>, including three or more glass sheets.

<13> The glass sheet composite according to any one of <2> to <12>, in which at least one glass sheet or the liquid layer is colored.

<14> The glass sheet composite according to any one of <2> to <13>, in which the liquid layer contains a fluorescent material.
<15> The glass sheet composite according to any one of <1> to <14>, in which a coating or a film is formed on at least one of the outermost surfaces of the glass sheet composite.
<16> The glass sheet composite according to any one of <1> to <15>, in which the glass sheet composite has a curved surface shape.
<17> The glass sheet composite according to any one of <2> to <16>, in which a difference between a refractive index of the liquid layer and the refractive index of each of the pair of glass sheets is 0.2 or less.
<18> The glass sheet composite according to any one of <1> to <17>, in which at least part of an outer circumferential edge surface of the glass sheet composite is sealed by a member not hindering vibration of the glass sheet composite.
<19> A glass sheet composite including two or more glass sheets and a liquid layer between at least a pair of glass sheets out of the glass sheets, in which a thickness of the liquid layer is 1/10 or less of a total thickness of the pair of glass sheets when a total thickness of the pair of glass sheets is 1 mm or less, and 100 μm or less when the total thickness of the pair of glass sheets is more than 1 mm.
<20> A diaphragm including the glass sheet composite according to any one of <1> to <19> and at least one vibrator disposed on one side or both sides of the glass sheet composite.
<21> An opening member using the glass sheet composite according to any one of claims 1 to 19 or the diaphragm according to <20>.
<22> A glass substrate for magnetic recording mediums, using the glass sheet composite according to any one of <1> to <19>.

Advantages of the Invention

According to the present invention, for example, in the application as a diaphragm used for loudspeakers, microphones, earphones, mobile devices, etc., sound reproducibility over the region from a low sound range to a high-frequency range is improved. In addition, for example, in the application as an opening member for buildings and vehicles, resonance can be made to hardly occur at all by utilizing its high vibration damping capability and in turn, generation of an abnormal noise attributed to resonance can be prevented. Furthermore, for example, in the application as a glass substrate for magnetic recording mediums, the vibration control effect can be increased.

BRIEF DESCRIPTION OF THE DRAWINGS

FIG. 5b is a cross-sectional view along line A-A' in FIG. 5a.
FIG. 7b is a cross-sectional view along line A-A' in FIG. 7a.
FIG. 8b is a cross-sectional view along line A-A' in FIG. 8a.

MODE FOR CARRYING OUT THE INVENTION

Details and other features of the present invention are described below based on embodiments of the present invention. Here, in the following drawings, the same or corresponding reference numeral is assigned to the same or corresponding members or parts, and duplicated description is thereby omitted. In addition, unless specifically indicated, the drawings are not intended to show a relative ratio among members or parts. Accordingly, specific dimensions may be properly selected in the context of the following non-limiting embodiments.

Furthermore, "-" indicating a numerical range in the present description is used in the sense of including the numerical values set forth before and after "-" as the lower limit value and the upper limit value, respectively.

<Glass Sheet Composite>

The glass sheet composite according to the present invention has the loss coefficient at 25° C. of $1\times10^{-2}$ or more and the longitudinal wave acoustic velocity in the sheet thickness direction of $5.5\times10^3$ m/s or more. Here, a high loss coefficient means that the vibration damping capability is high.

As for the loss coefficient, a value calculated by a half-width method is used. Denoting f as the resonant frequency of a material and W as a frequency width at a point decreased by −3 dB from the peak value of the amplitude h (namely, the point of maximum amplitude −3 [dB]), the loss coefficient is defined as a value represented by $\{W/f\}$.

In order to prevent the resonance, the loss coefficient may be increased, namely, this means that the frequency width W becomes relatively large with respect to the amplitude h and the peak becomes broader.

The loss coefficient is a characteristic value of a material, etc. and, for example, in the case of a simplex glass sheet, it differs depending on the composition, relative density, etc. Incidentally, the loss coefficient can be measured by a dynamic modulus test such as resonation method.

The longitudinal wave acoustic velocity means a velocity at which a longitudinal wave propagates in a diaphragm. The longitudinal wave acoustic velocity and the Young's modulus can be measured by an ultrasonic pulse method described in Japanese Industrial Standards (JIS-R1602-1995).

In the glass sheet composite according to the present invention, as a specific configuration for obtaining a high loss coefficient and a high longitudinal wave acoustic velocity, it is preferable to include two or more glass sheets and include a predetermined liquid layer between at least a pair of glass sheets out of the glass sheets.

(Liquid Layer)

The glass sheet composite according to the present invention can realize a high loss coefficient by providing a layer formed of a fluid (liquid layer) between at least a pair of glass sheets. Among others, when the viscosity and surface tension of the liquid layer are set to suitable ranges, the loss coefficient can be more increased.

This is considered attributed to the fact that, unlike the case of providing a pair of glass sheets with an adhesive layer therebetween, the pair of glass sheets are not fixed and continue exhibiting vibration characteristics of each individual glass sheet.

The liquid layer preferably has a viscosity coefficient at 25° C. of $1\times10^{-4}$ to $1\times10^{3}$ Pa·s and a surface tension at 25° C. of 15 to 80 mN/m. If the viscosity is too low, vibration can be hard to transmit, and if it is too high, a pair of glass sheets located on both sides of the liquid layer are fixed to each other and exhibit a vibration behavior as one glass sheet, making damping of resonant vibration difficult. If the surface tension is too low, the adhesion between glass sheets decreases, and vibration can be hard to transmit. If the surface tension is too high, a pair of glass sheets located on both sides of the liquid layer are readily fixed to each other and exhibit a vibration behavior as one glass sheet and in turn, the resonant vibration is difficult to damp.

The viscosity coefficient at 25° C. of the liquid layer is more preferably $1\times10^{-3}$ Pa·s or more, still more preferably $1\times10^{-2}$ Pa·s or more, and also is more preferably $1\times10^{2}$ Pa·s or less, still more preferably $1\times10$ Pa·s or less.

The surface tension at 25° C. of the liquid layer is more preferably 20 mN/m or more, still more preferably 30 mN/m or more.

The viscosity of the liquid layer can be measured by a rotational viscometer, etc.

The surface tension of the liquid layer can be measured by a ring method, etc.

If the vapor pressure of the liquid layer is too high, the liquid layer may evaporate, resulting in failing to function as a glass sheet composite. Accordingly, the vapor pressure at 25° C. and 1 atm of the liquid layer is preferably $1\times10^{4}$ Pa or less, more preferably $5\times10^{3}$ Pa or less, still more preferably $1\times10^{3}$ Pa or less. In the case where the vapor pressure is high, sealing, etc. may be applied so as to prevent the liquid layer from evaporating, but in that case, the sealing material should not hinder the vibration of the glass sheet composite.

In view of high rigidity maintenance and vibration transfer, a smaller thickness of the liquid layer is more preferred. Specifically, when the total thickness of the pair of glass sheets is 1 mm or less, the thickness of the liquid layer is preferably 1/10 or less, more preferably 1/20 or less, still more preferably 1/30 or less, yet still more preferably 1/50 or less, even still more preferably 1/70 or less, even yet still more preferably 1/100 or less, of the total thickness of the pair of glass sheets.

In the case where the total thickness of the pair of glass sheets is more than 1 mm, the thickness of the liquid layer is preferably 100 µm or less, more preferably 50 µm or less, still more preferably 30 µm or less, yet still more preferably 20 µm or less, even still more preferably 15 µm or less, even yet still more preferably 10 µm or less.

The lower limit of the thickness of the liquid layer is preferably 0.01 µm or more in view of film-forming property and durability.

It is preferred that the liquid layer is chemically stable and a reaction does not occur between the liquid layer and a pair of glass sheets located on both sides of the liquid layer. The "chemically stable" means, for example, to undergo little degradation (deterioration) by light irradiation or not to cause solidification, vaporization, decomposition, discoloration, chemical reaction with glass, etc. at least in a temperature region of −20 to 70° C.

The component of the liquid layer includes, specifically, water, oil, an organic solvent, a liquid polymer, an ionic liquid, a mixture thereof.

More specifically, the component includes propylene glycol, dipropylene glycol, tripropylene glycol, straight silicone oil (dimethyl silicone oil, methyl phenyl silicone oil, methyl hydrogen silicone oil), denatured silicone oil, an acrylic acid-based polymer, liquid polybutadiene, glycerin paste, a fluorine-based solvent, a fluororesin, acetone, ethanol, xylene, toluene, water, mineral oil, and a mixture thereof. Among these, it is preferable to contain at least one member selected from the group consisting of propylene glycol, dimethyl silicone oil, methyl phenyl silicone oil, methyl hydrogen silicone oil, and denatured silicone oil, and it is more preferable to contain propylene glycol or silicone oil as a main component.

In addition, a slurry having dispersed therein a powder may also be used as the liquid layer. From the viewpoint of enhancing the loss coefficient, the liquid layer is preferably a uniform fluid, but in the case of imparting design or functionality such as coloration or fluorescence to the glass sheet composite, the slurry is effective.

The content of the powder in the liquid layer is preferably from 0 to 10 vol %, more preferably from 0 to 5 vol %.

From the viewpoint of preventing sedimentation, the particle diameter of the powder is preferably from 10 nm to 1 µm, more preferably 0.5 µm or less.

In addition, from the viewpoint of imparting design and functionality, the liquid layer may contain a fluorescent material. The liquid layer may be either a slurry-like liquid layer in which a fluorescent material is dispersed as a powder, or a uniform liquid layer in which a fluorescent material is mixed as a liquid. Because of this configuration, an optical function such as light absorption or light emission can be imparted to the glass sheet composite.

(Glass Sheet)

Figure 1:
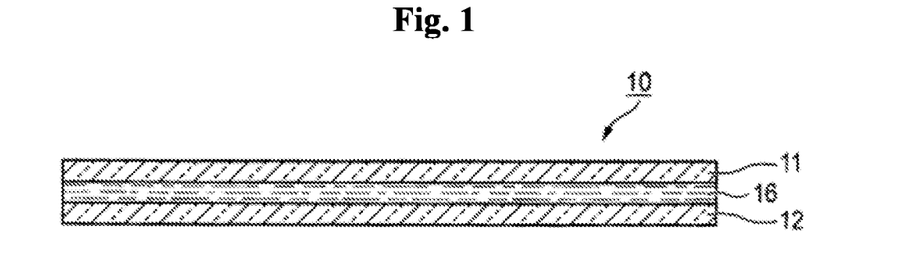
FIG. 1 is a cross-sectional view illustrating one example of the glass sheet composite of the present invention.

In the glass sheet composite (10) according to the present invention, at least a pair of glass sheets are preferably provided to sandwich the liquid layer (16) from both sides (FIG. 1). Denoting one glass sheet as glass sheet A (11) and the other as glass sheet B (12), when the glass A resonates, the presence of the liquid layer can prevent glass sheet B from resonating or can damp resonant vibration of glass sheet B, so that the glass sheet composite can increase the loss coefficient, compared to glass sheets alone.

Out of two glass sheets constituting the pair of glass sheets, the peak top value of resonant frequency of one glass sheet A preferably differs from that of another glass sheet B, and it is more preferable that the ranges of resonant frequencies do not overlap each other. However, even when the ranges of resonant frequencies of glass sheet A and glass sheet B overlap each other or the peak top value is the same, at the time of resonation of one glass sheet, the vibration of the other glass sheet is not synchronized due to the presence of the liquid layer, and the resonation is thereby canceled to a certain extent, so that a high loss coefficient can be obtained, compared with glass sheets alone.

More specifically, denoting Qa and wa respectively as the resonant frequency (peak top) and the half-width of resonance amplitude of glass sheet A and denoting Qb and wb respectively as the resonant frequency (peak top) and the half-width of resonance amplitude of the other glass sheet B, it is preferable to satisfy the relationship of the following [formula 1]:

$$(wa+wb)/4 < |Qa-Qb|$$ [formula 1]

As the value on the left side in [formula 1] is larger, the difference ($|Qa-Qb|$) in the resonant frequency between glass sheet A and glass sheet B becomes larger, and a high loss coefficient is advantageously obtained.

Accordingly, it is more preferable to satisfy the following [formula 1'], and it is still more preferable to satisfy the following [formula 1"]:

$$(wa+wb)/2 < |Qa-Qb|$$ [formula 1']

$$(wa+wb)/1 < |Qa-Qb|$$ [formula 1"]

Incidentally, the resonant frequency (peak top) of glass sheet and the half-width of resonance amplitude can be measured by the same method as that for the loss coefficient in the glass sheet composite.

The mass difference between glass sheet A and glass sheet B is preferably smaller, and it is more preferred that there is no mass difference. If there is a difference in the mass of glass sheet, resonation of a lighter glass sheet can be reduced by a heavier glass sheet, but resonation of a heavier glass sheet can hardly at all be reduced by a lighter glass sheet. This is because if the mass ratio is imbalance, in principle resonant vibrations cannot be mutually canceled due to the difference in inertial force.

The mass ratio of glass sheet A and glass sheet B, represented by (glass sheet A/glass sheet B), is preferably from 0.8 to 1.25 (from 8/10 to 10/8), more preferably from 0.9 to 1.1 (from 9/10 to 10/9), still more preferably 1.0 (10/10).

In both of glass sheet A and glass sheet B, as the thickness is smaller, the glass sheets are more readily adhered to each other via a liquid layer, and the glass sheet can be vibrated with less energy. Accordingly, in the application as a diaphragm for loudspeakers, etc., the smaller the glass sheet thickness, the better. Specifically, the sheet thickness of each of glass sheet A and glass sheet B is preferably 15 mm or less, more preferably 10 mm or less, still more preferably 5 mm or less, yet still more preferably 3 mm or less, even still more preferably 1.5 mm or less, even yet still more preferably 0.8 mm or less. On the other hand, if the thickness is too small, n effects of surface defects of the glass sheet are likely to be revealed, and cracking occurs more easily, or a strengthening treatment is difficult to apply. For this reason, the thickness is preferably 0.01 mm or more, more preferably 0.05 mm or more.

In addition, in the application as an opening member for buildings and vehicles, which reduces occurrence of an abnormal noise attributed to a resonance phenomenon, the sheet thickness of each of glass sheet A and glass sheet B is preferably from 0.5 to 15 mm, more preferably from 0.8 to 10 mm, still more preferably from 1.0 to 8 mm.

In the application as a glass substrate for magnetic recording mediums, of which vibration absorbing effect is enhanced, the sheet thickness of each of glass sheet A and glass sheet B is preferably from 0.3 to 1.2 mm, more preferably from 0.4 to 1.0 mm, still more preferably from 0.5 to 0.8 mm.

In the preferred application as a diaphragm, either glass sheet A or glass sheet B or both preferably have a high loss coefficient, because increased vibration damping is achieved by the glass sheet composite. Specifically, the loss coefficient at 25° C. of the glass sheet is preferably $1 \times 10^{-4}$ or more, more preferably $3 \times 10^{-4}$ or more, still more preferably $5 \times 10^{-4}$ or more. The upper limit is not particularly limited but is preferably $5 \times 10^{-3}$ or less in view of productivity and manufacturing cost. It is more preferred that both of glass sheet A and glass sheet B have the above-described loss coefficient. Incidentally, the loss coefficient of the glass sheet can be measured by the same method as that for the loss coefficient of the glass sheet composite.

In the preferred application as a diaphragm, either glass sheet A or glass sheet B or both preferably has a high longitudinal wave acoustic velocity in the sheet thickness direction, because the sound reproducibility in a high-frequency region is enhanced. Specifically, the longitudinal wave acoustic velocity of the glass sheet is preferably $5.5 \times 10^3$ m/s or more, more preferably $5.7 \times 10^3$ m/s or more, still more preferably $6.0 \times 10^3$ m/s or more. The upper limit is not particularly limited but is preferably $7.0 \times 10^3$ m/s or less in view of the productivity of glass sheet and the raw material cost. It is more preferred that both of glass sheet A and glass sheet B satisfy the above-described acoustic velocity.

Incidentally, the acoustic velocity of the glass sheet can be measured by the same method as that for the longitudinal wave acoustic velocity of the glass sheet composite.

The composition of each of glass sheet A and glass sheet B is not particularly limited but is preferably, for example, in the following ranges:

$SiO_2$: from 40 to 80 mass %, $Al_2O_3$: from 0 to 35 mass %, $B_2O_3$: from 0 to 15 mass %, MgO: from 0 to 20 mass %, CaO: from 0 to 20 mass %, SrO: from 0 to 20 mass %, BaO: from 0 to 20 mass %, $Li_2O$: from 0 to 20 mass %, $Na_2O$: from 0 to 25 mass %, $K_2O$: from 0 to 20 mass %, $TiO_2$: from 0 to 10 mass %, and $ZrO_2$: 0 to 10 mass %, provided that the composition above accounts for 95 mass % or more of the entire glass.

The composition of each of glass sheet A and glass sheet B is more preferably in the following ranges:

$SiO_2$: from 55 to 75 mass %, $Al_2O_3$: from 0 to 25 mass %, $B_2O_3$: from 0 to 12 mass %, MgO: from 0 to 20 mass %, CaO: from 0 to 20 mass %, SrO: from 0 to 20 mass %, BaO: from 0 to 20 mass %, $Li_2O$: from 0 to 20 mass %, $Na_2O$: from 0 to 25 mass %, $K_2O$: from 0 to 15 mass %, $TiO_2$: from 0 to 5 mass %, and $ZrO_2$: 0 to 5 mass %, provided that the composition above accounts for 95 mass % or more of the entire glass.

As the specific gravity is smaller in both glass sheet A and glass sheet B, the glass sheet can be vibrated with less energy. Specifically, the specific gravity of each of glass sheet A and glass sheet B is preferably 2.8 or less, more preferably 2.6 or less, still more preferably 2.5 or less. The lower limit is not particularly limited but is preferably 2.2 or more.

When the specific modulus, which is a value obtained by dividing the Young's modulus of both glass sheet A and glass sheet B by the density thereof, is larger, the rigidity of the glass sheet can be increased. Specifically, the specific modulus of each of glass sheet A and glass sheet B is preferably $2.5 \times 10^7$ $m^2/s^2$ or more, more preferably $2.8 \times 10^7$ $m^2/s^2$ or more, still more preferably $3.0 \times 10^7$ $m^2/s^2$ or more. The upper limit is not particularly limited but is preferably $4.0 \times 10^7$ $m^2/s^2$ or less.

(Glass Sheet Composite)

In the glass sheet composite, a higher loss coefficient is preferred, because more increased vibration damping is achieved. The loss coefficient at 25° C. of the glass sheet composite according to the present invention is $1\times10^{-2}$ or more, preferably $2\times10^{-2}$ or more, more preferably $5\times10^{-2}$ or more.

In addition, since a higher acoustic velocity leads to enhancement of reproducibility of high-frequency sound in a diaphragm formed, the longitudinal wave sound velocity in the sheet thickness direction of the glass sheet composite is preferably $5.5\times10^3$ m/s or more, more preferably $5.7\times10^3$ m/s or more, still more preferably $6.0\times10^3$ m/s or more. The upper limit is not particularly limited but is preferably $7.0\times10^3$ m/s or less.

When the linear transmittance of the glass sheet composite is high, application as a translucent member becomes possible. Accordingly, the visible light transmittance determined in conformity with Japanese Industrial Standards (JIS R3106-1998) is preferably 60% or more, more preferably 65% or more, still more preferably 70% or more.

Incidentally, the translucent member includes, for example, a transparent loudspeaker, a transparent microphone, an opening member for buildings and vehicles, and other applications.

In order to increase the transmittance of the glass sheet composite, it is also useful to match the refractive indices. More specifically, the refractive indices of glass sheet and liquid layer constituting the glass sheet composite are preferably closer, because reflection and interference at the interface are prevented. Above all, the difference between the refractive index of the liquid layer and the refractive index of each of the pair of glass sheets in contact with the liquid layer is preferably 0.2 or less, more preferably 0.1 or less, still more preferably 0.01 or less.

At least one glass sheet or the liquid layer constituting the glass sheet composite can also be colored. This is useful in the case where a design pattern or functionality such as IR cut, UV cut and privacy glass is desired for the glass sheet composite.

Figure 2:
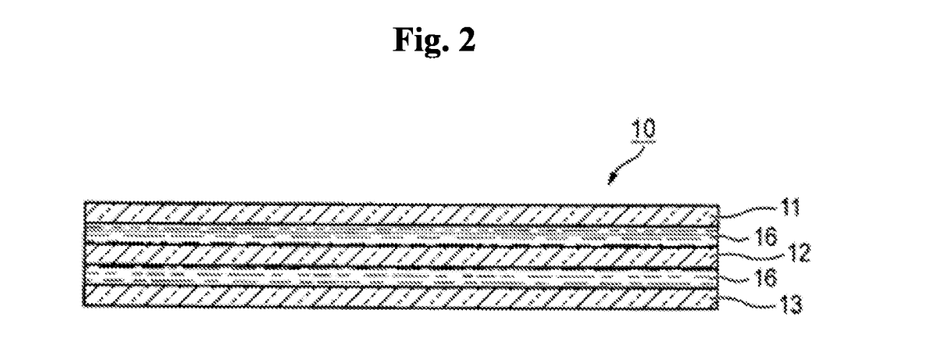
FIG. 2 is a cross-sectional view illustrating another example of the glass sheet composite of the present invention.

The glass sheets constituting the glass sheet composite may be sufficient if two or more sheets are used, but three or more glass sheets may also be used (FIG. 2). A glass sheet having a different composition may be used in the case of two sheets in glass sheet A and glass sheet B, and in the case of three or more sheets, glass sheet A, glass sheet B and glass sheet C (13); the same composition may be used for all glass sheets; or glass sheets having the same composition and a glass sheet having a different composition may be used in combination. Among others, two or more kinds of glass sheets differing in the composition are preferably used in view of vibration damping.

Similarly, as to the mass and thickness, the glass sheets may be all different, may be all the same, or some may be different. Above all, in view of vibration damping, all of the constituent glass sheets preferably have the same mass.

A physically strengthened glass sheet or a chemically strengthened glass sheet may also be used as at least one glass sheet constituting the glass sheet composite. This is useful in preventing breaking of the glass sheet composite. When an increase in the strength of the glass sheet composite is desired, the physically strengthened glass sheet or chemically strengthened glass sheet is preferably used for the glass sheet located on the outermost surface of the glass sheet composite, and it is more preferred that all of the constituent glass sheets are the physically strengthened glass sheet or strengthened glass sheet.

In addition, from the viewpoint of increasing the longitudinal wave acoustic velocity or strength, it is also useful to use crystallized glass or phase-separated glass as the glass sheet. Above all, when an increase in the strength of the glass sheet composite is desired, crystallized glass or phase-separated glass is preferably used for the glass sheet located on the outermost surface of the glass sheet composite.

Figure 3:
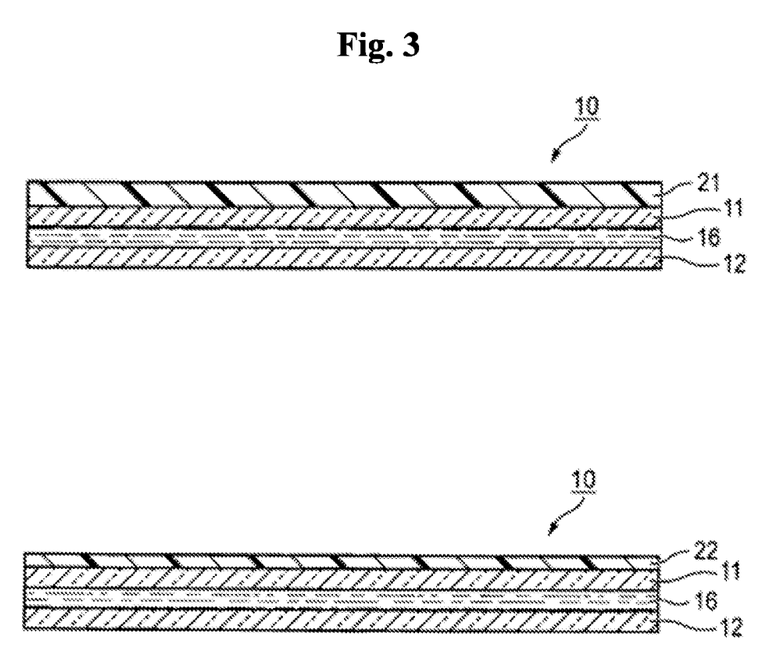
FIG. 3 is a cross-sectional view illustrating still another example of the glass sheet composite of the present invention.

On at least one outermost surface of the glass sheet composite, a coating (21) or a film (22) may be formed as long as the effects of the present invention are not impaired (FIG. 3). The application of a coating or attachment of a film is suitable for scratch protection, etc.

The thickness of the coating or film is preferably ⅕ or less of the sheet thickness of the glass sheet of the surface layer. A conventionally known material can be used for the coating or film, and the coating includes, for example, a water-repellent coating, a hydrophilic coating, a water sliding coating, an oil-repellent coating, a light reflection preventive coating, and a heat shielding coating. The film may include, for example, a glass anti-shatter film, a color film, a UV cut film, an IR cut film, a heat-shielding film, and an electromagnetic wave shielding film.

The shape of the glass sheet composite can be appropriately designed according to use and may be a flat plate-like shape or a curved surface shape.

In order to raise the output sound pressure level in a low-frequency range, a structure in which an enclosure or a baffle plate is attached to the glass sheet composite may also be adopted. Although the material of the enclosure or baffle plate is not particularly limited, it is preferable to use the glass sheet composite of the present invention.

Figure 4:
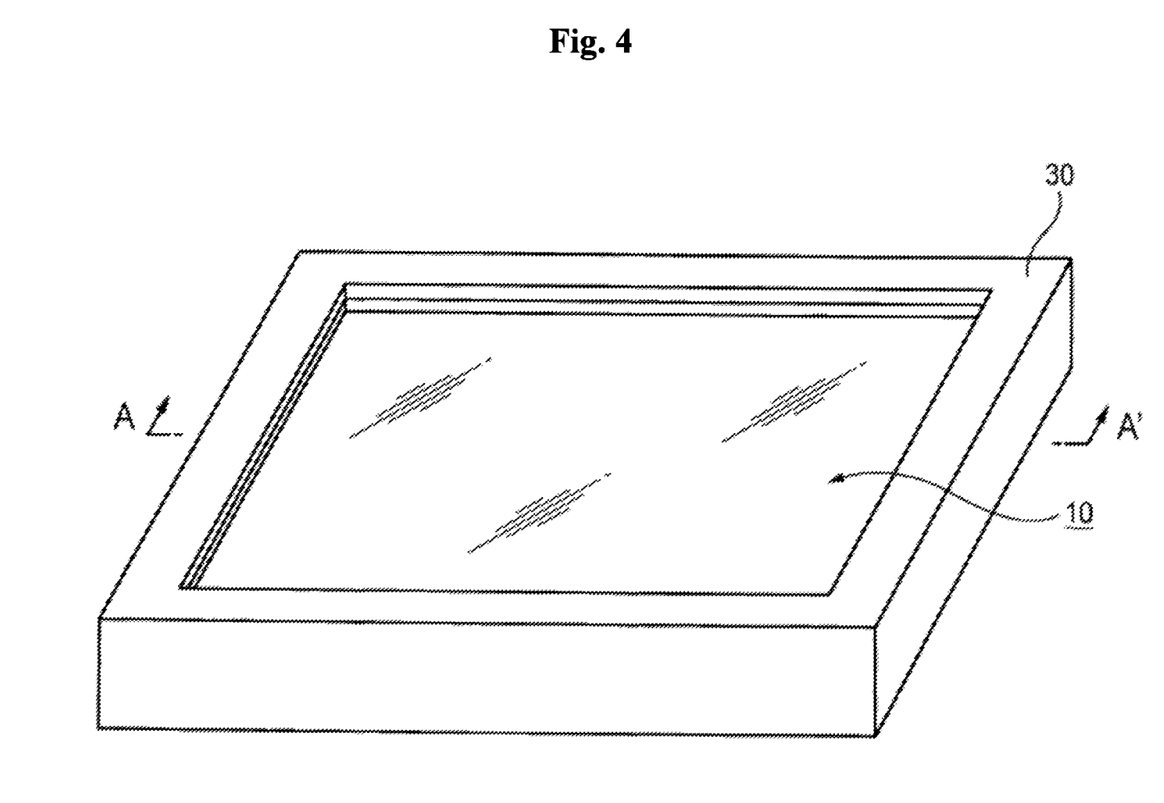
FIG. 4 is a perspective view illustrating yet still another example of the glass sheet composite of the present invention.
Figure 5A:
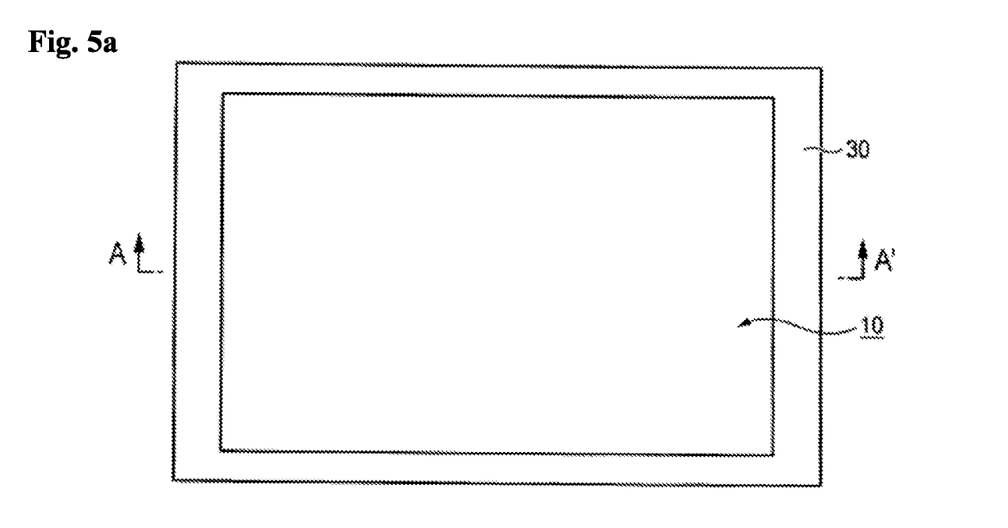
FIG. 5a is a plan view of the glass sheet composite of FIG. 4.
Figure 5B:
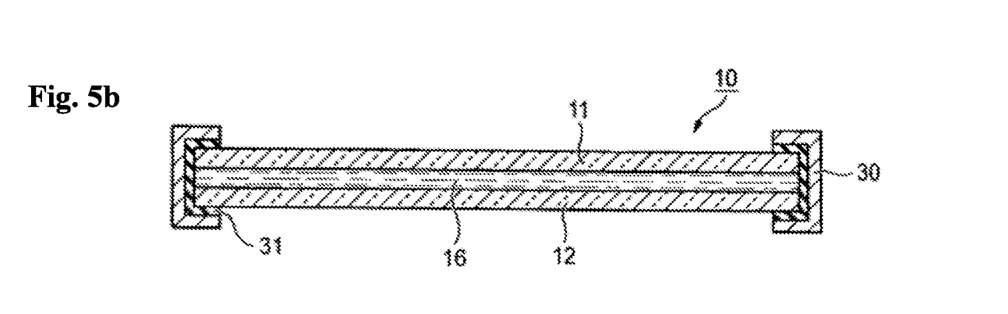

On at least one outermost surface of the glass sheet composite, a frame (30) may be provided as long as the effects of the present invention are not impaired (FIGS. 4, 5*a* and 5*b*). The frame is useful when it is desired to enhance the rigidity of the glass sheet composite or to maintain a curved surface shape. As the material of the frame, a conventionally known material may be used, and for example, ceramic and single crystal materials such as $Al_2O_3$, SiC, $Si_3N_4$, AlN, mullite, zirconia, yttria and YAG, metal and alloy materials such as steel, aluminum, titanium, magnesium, and tungsten carbide, a composite material such as FRP, a resin material such as acryl and polycarbonate, a glass material, and wood may be used.

The weight of the frame used is preferably 20% or less, more preferably 10% or less, of the weight of the glass sheet.

Incidentally, a seal material (31) may also be provided between the glass sheet composite and the frame, and the liquid layer can thereby be prevented from leaking through the frame.

Figure 6:
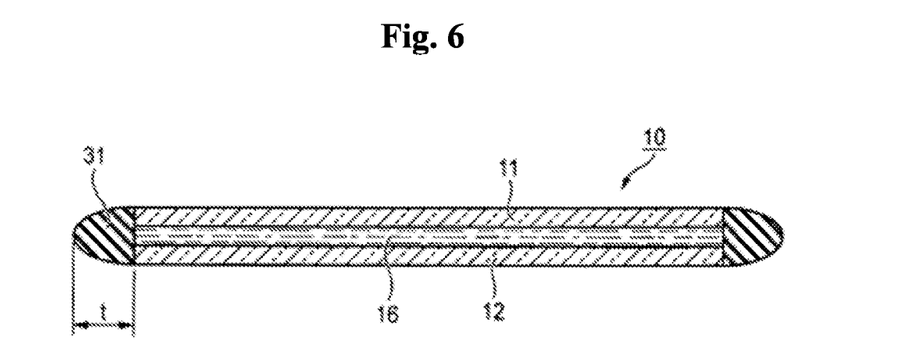
FIG. 6 is a cross-sectional view illustrating another example of the glass sheet composite of the present invention.
Figure 7A:
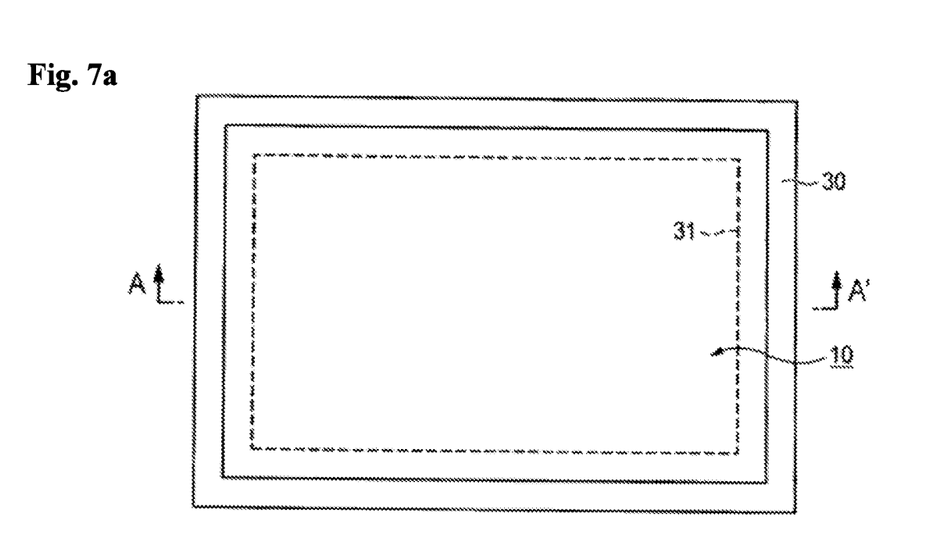
FIG. 7a is a plan view illustrating another example of the glass sheet composite of the present invention.
Figure 7B:
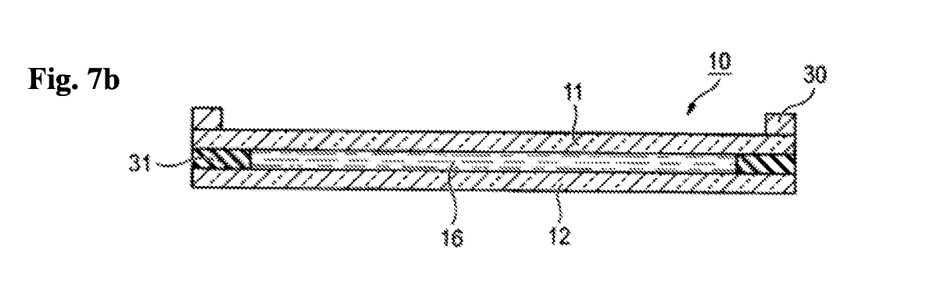
Figure 8A:
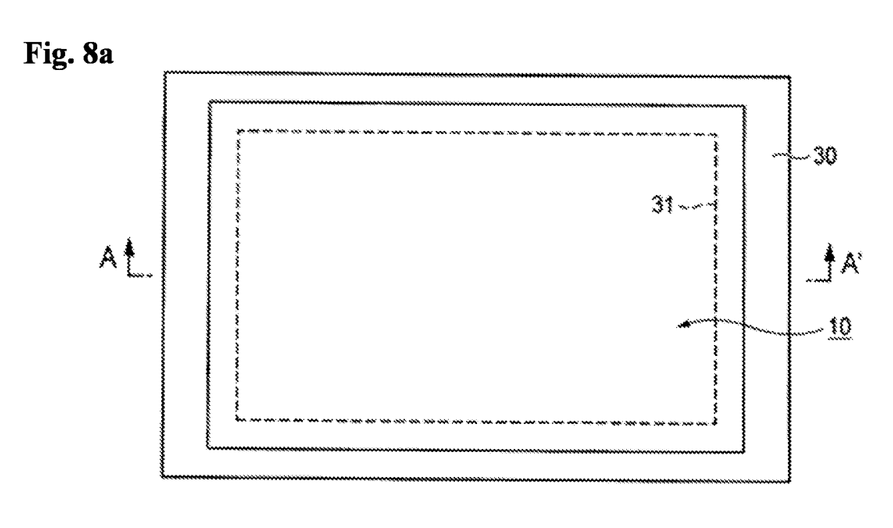
FIG. 8a is a plan view illustrating another example of the glass sheet composite of the present invention.
Figure 8B:
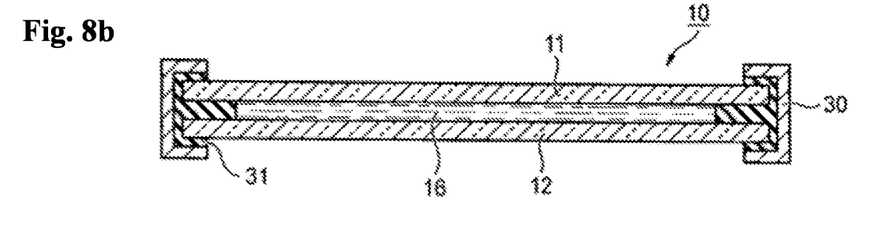

At least part of the outer circumferential edge surface of the glass sheet composite may be sealed by a member not hindering vibration of the glass sheet composite (FIG. 6). As the seal material (31), highly elastic rubber, resin, gel, etc. may be used.

The resin that can be used for the seal material includes, for example, acrylic, cyanoacrylate-based, epoxy-based, silicone-based, urethane-based and phenolic resins. The curing method includes one-component type, two-component mixing type, heat curing, ultraviolet curing, and visible light curing.

A thermoplastic resin (hot-melt bond) may also be used. Examples thereof include an ethylene vinyl acetate-based, polyolefin-based, polyamide-based, synthetic rubber-based, acrylic and polyurethane-based resins.

As to the rubber, for example, natural rubber, synthetic natural rubber, butadiene rubber, styrenebutadiene rubber, butyl rubber, nitrile rubber, ethylenepropylene rubber, chloroprene rubber, acrylic rubber, chlorosulfonated polyethylene rubber (hypalon), urethane rubber, silicone rubber, fluoro rubber, ethylenevinyl acetate rubber, epichlorohydrin rubber, polysulfide rubber (Thiokol), and hydrogenated nitrile rubber can be used.

If the thickness t of the seal material is too small, sufficient strength cannot be ensured, whereas if it is too large, the vibration may be hindered. Accordingly, the thickness of the seal material is preferably 10 μm or more and 5 times or less the total thickness of the glass composite, more preferably 50 μm or more and smaller than the total thickness of the glass composite.

In order to, for example, prevent separation at the interface between the glass sheet and the liquid layer of the glass sheet composite, at least part of the surfaces of the facing glass sheets may be coated with the seal material 31 above as long as the effects of the present invention are not impaired (FIGS. 7a, 7b, 8a and 8b). In this case, the area of the seal material-coated part is preferably 20% or less, more preferably 10% or less, still more preferably 5% or less, of the area of the liquid layer so as not to hinder the vibration.

Figure 9:
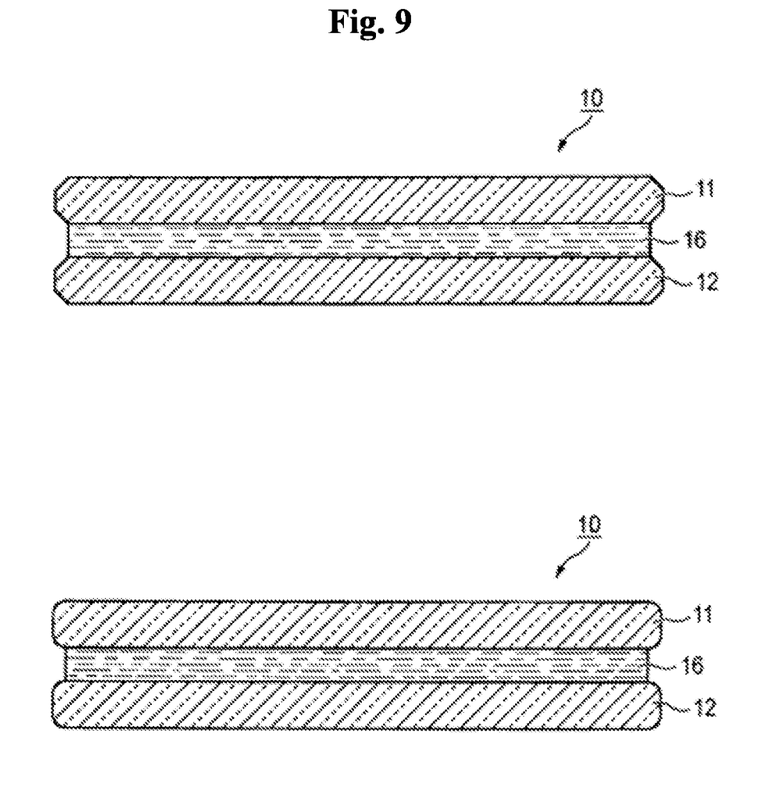
FIG. 9 is a cross-sectional view illustrating still another example of the glass sheet composite of the present invention.

Furthermore, in order to enhance the sealing performance, the edge portion of the glass sheet may also be processed into an appropriate shape. For example, the contact area of the seal material with glass is increased by C-chamfering (the cross-sectional shape of the glass sheet is a trapezoidal shape) or R-chamfering (the cross-sectional shape of the glass sheet is a substantially arc shape) of the edge part of the glass sheet at least on one side, and the adhesive strength of the seal material to the glass can thereby be enhanced (FIG. 9).

The present invention also relates to a glass sheet composite including two or more glass sheets and including a liquid layer between at least a pair of glass sheets out of the glass sheets, in which the thickness of the liquid layer is $1/10$ or less of the total thickness of the pair of glass sheets when the total thickness of the pair of glass sheets is 1 mm or less, and 100 m or less when the total thickness of the pair of glass sheets is more than 1 mm.

Preferred embodiments of this glass sheet composite are the same as those of the glass sheet composite described above.

(Diaphragm, Opening Member, Glass Substrate for Magnetic Recording Mediums)

The present invention also relates to a diaphragm including the glass sheet composite above and a vibrator, an opening member using the glass sheet composite, and a glass substrate for magnetic recording mediums using the glass sheet composite.

The diaphragm can be caused to function as a loudspeaker, a microphone, an earphone, or a casing's vibrating body or casing's speaker of a mobile device, etc. by disposing, for example, one or more vibration elements or vibration detection elements (vibrators) on one side or both sides of the glass sheet composite. In order to enhance the output sound pressure level, two or more vibration elements are preferably disposed on both sides of the glass sheet composite. In general, the position of the vibrators with respect to the diaphragm is preferably the central part of the composite, but since the material has a high acoustic velocity and a high damping performance, the vibrator may be disposed at an edge part of the glass sheet composite. Use of the diaphragm according to the present invention can facilitate reproduction of the sound in a high-frequency region, of which reproduction had been conventionally difficult. In addition, the degree of freedom in the size, shape, color, etc. of the glass sheet composite is high, and a design can be applied, so that a diaphragm with excellent designability can be obtained. Furthermore, by sampling sound or vibration by a sound collecting microphone or a vibration detector disposed on the surface or in the vicinity of the glass sheet composite and generating vibration of the same phase or reverse phase in the glass sheet composite, the sound or vibration sampled can be amplified or canceled. At this time, in the case where the sound or vibration characteristics at the sampling point above are caused to undergo a change based on a certain acoustic transfer function in the course of propagating to the glass composite and an acoustic conversion transfer function is present in the glass composite, the vibration can be accurately amplified or canceled by correcting the amplitude and phase of the control signal by means of a control filter. At the time of constructing the control filter above, for example, the least-square (LMS) algorithm can be used.

As a more specific configuration, for example, the glass composite of the present invention can be used for all or at least one glass sheet of a double glass to provide a structure where the vibration level of the sheet at the inflow side of a sonic vibration to be controlled or the sound pressure level of a space present between glasses is sampled and after appropriate signal correction by a control filter, output to a vibration element on the glass composite disposed at the outflow side of the sonic vibration.

This diaphragm can be utilized, for example, as a member for electronic devices, in a full-range loudspeaker, a loudspeaker for reproducing a low-pitched sound range of 15 Hz to 200 Hz, a loudspeaker for reproducing a high-pitched sound range of 10 kHz to 100 kHz, a large loudspeaker having a diaphragm area of 0.2 $m^2$ or more, a small loudspeaker having a diaphragm area of 3 $cm^2$ or less, a flat loudspeaker, a cylindrical loudspeaker, a transparent loudspeaker, a mobile device cover glass functioning as a loudspeaker, a TV display cover glass, a display outputting video signals and audio signals from the same surface, a loudspeaker for wearable displays, an electronic display device, and lighting equipment. In addition, the diaphragm can be used as a diaphragm or vibration sensor for headphones, earphones or microphones.

This diaphragm can be used as an interior vibration member of transport machinery such as vehicle, or as an in-vehicle•in-device loudspeaker and can form, for example, a side-view mirror, a sun visor, an instrument panel, a dashboard, a ceiling, a door, or other interior panels, each functioning as a loudspeaker. In addition, such a member can also be caused to function as a microphone and a diaphragm for active noise control.

With respect to other uses, the diaphragm can be used as a diaphragm for ultrasonic generators, a slider for ultrasonic motors, a low frequency generator, a vibrator for propagating sonic vibration in liquid, a water tank and a container each using the vibrator, a vibration element, a vibration detection element, and an actuator material for vibration damping equipment.

The opening member includes, for example, an opening member used for buildings, transport machinery, etc. For example, in the case of using a glass sheet composite less likely to resonate in the frequency band of noise generated from the drive part, etc. of vehicles, airplanes, ships, power generators, etc., an excellent effect of inhibiting generation of particularly such noise can be obtained. In addition, a function such as IR cut, UV cut and coloration can be imparted to the glass sheet composite.

At the time of application as an opening member, a diaphragm in which one or more vibration elements or vibration detection elements (vibrators) are disposed on one side or both sides of the glass sheet composite can be caused to function as a loudspeaker or a microphone. Use of the glass sheet composite according to the present invention can facilitate reproduction of the sound in a high-frequency region, of which reproduction had been conventionally difficult. In addition, the degree of freedom in the size, shape, color, etc. of the glass sheet composite is high, and a design can be applied, so that an opening member also having excellent designability can be obtained. Furthermore, by sampling sound or vibration by a sound collecting microphone or a vibration detector disposed on the surface or in the vicinity of the glass sheet composite and generating vibration of the same phase or reverse phase in the glass sheet composite, the sound or vibration sampled can be amplified or canceled.

More specifically, the member can be used as an in-vehicle loudspeaker, an outside-the-vehicle loudspeaker, and a windshield, side glass, rear glass, or roof glass having a sound insulating function. At this time, the structure may be configured to be capable of transmitting or blocking only a specific sonic vibration. It can also be used as a vehicle window, structural member, or decorative plate that has improved water-repellency, snow accretion resistance, ice accretion resistance or antifouling property due to sonic vibration. Specifically, the member can be used as an automotive window glass, mirror, lens or sensor, and a cover glass thereof.

The opening member for buildings can be used as window glass, door glass, roof glass, an interior material, an exterior material, a decorative material, a structural material, an outer wall, a sound insulating board, a sound insulating wall, and a solar cell cover glass, each functioning as a diaphragm and a vibration detecting device. They can also be caused to function as a sound reflecting (reverberation) plate. Furthermore, the above-described water repellency, snow accretion resistance and antifouling property can be enhanced by the sonic vibration.

As to the glass substrate for magnetic recording mediums, a high vibration control effect can be imparted to the glass sheet composite and therefore, this is very useful in view of suppressing fluttering of the substrate.

(Production Method of Glass Sheet Composite)

The glass sheet composite according to the present invention can be obtained by forming a liquid layer between a pair of glass sheets.

The method for forming a liquid layer between a pair of glass sheets is not particularly limited and includes, for example, a method of forming a liquid layer on a surface of a glass sheet and disposing another glass sheet thereon, a method of laminating together glass sheets each having a liquid layer formed on a surface, and a method of pouring a liquid layer into a gap between two glass sheets.

The formation of the liquid layer is not particularly limited as well and includes, for example, coating, spraying, etc. of a glass sheet surface with a liquid constituting the liquid layer.

EXAMPLES

The present invention is specifically described below by referring to Examples, but the present invention is not limited thereto.
<Evaluation Method>
(Young's Modulus, Longitudinal Wave Acoustic Velocity, Density)

The Young's modulus E and acoustic velocity V of the glass sheet and the longitudinal wave acoustic velocity V of the glass sheet composite were measured at 25° C. by an ultrasonic pulse method described in Japanese Industrial Standards (JIS-R1602-1995) by using a test piece having a length of 60 mm, a width of 12 mm, and a thickness of 0.5 to 1 mm (DL35PLUS, manufactured by Olympus Corporation was used). As for the longitudinal wave acoustic velocity of the glass sheet composite, the acoustic velocity in the sheet thickness direction was measured.

The density p of the glass sheet was measured at 25° C. by the Archimedes method ("AUX320", manufactured by Shimadzu Corporation).
(Resonant Frequency)

The loss coefficients of the glass sheet and glass sheet composite were measured at 25° C. using the same test piece as in the measurement above by means of a resonance-type internal friction measuring apparatus ("JE-HT" manufactured by Nihon Techno-Plus Corporation). Specifically, an AC voltage in the band of 600 to 3,000 Hz was continuously applied to the test piece so as to bend the glass substrate and cause free vibration in the primary mode, and the change of vibration amplitude was measured. The frequency at which the vibration amplitude h becomes maximum was defined as the resonant frequency f.
(Loss Coefficient)

As for the loss coefficient, using the resonant frequency f of the material determined in the measurement above and the frequency width W at a point decreased by −3 dB from the maximum amplitude (namely, the point of maximum amplitude −3 [dB]), the value represented by W/f was defined as the loss coefficient.

With respect to a test piece to which the method above cannot be applied for the reason of, for example, having a non-symmetric peak shape, in the resonant frequency measurement, the damping time of vibration amplitude upon stopping of vibration from a resonance state was measured, and the loss coefficient was calculated using the damping time.
(Viscosity Coefficient)

The viscosity coefficient of the liquid layer was measured at 25° C. by means of a rotational viscometer (RVDV-E, manufactured by BROOKFIELD).
(Surface Tension)

The surface tension of the liquid layer was measured by the following method.

A metal ring hung in parallel to a test liquid at 25° C. was sunk into the liquid, and the ring was then gradually pulled up in the vertical direction. At this time, the peak of the force applied by the liquid membrane was measured to calculate the surface tension.

Example 1

Glass sheet 1 of 12 mm×60 mm×0.5 mm was prepared as glass sheet A and coated with ion-exchanged water as a liquid layer and furthermore, glass sheet 2 of 12 mm×60 mm×0.5 mm was adhered thereto as glass sheet B to obtain a glass sheet composite of 12 mm×60 mm×1 mm. The compositions (mass %) and the physical property values of glass sheet 1 and glass sheet 2 are as follows: (glass sheet 1) $SiO_2$: 60%, $Al_2O_3$: 17%, $B_2O_3$: 8%, MgO: 3%, CaO: 4%, SrO: 8%, density: 2.5 $g/cm^3$, Young's modulus: 77 GPa, specific modulus: $3.1×10^7$ $m^2/s^2$; (glass sheet 2) $SiO_2$: 61.5%, $Al_2O_3$: 20%, $B_2O_3$: 1.5%, MgO: 5.5%, CaO: 4.5%, SrO: 7%, density: 2.7 $g/cm^3$, Young's modulus: 85 GPa, specific modulus: $3.2×10^7$ $m^2/s^2$.

Examples 2 to 12

Glass sheet composites were obtained in the same manner as in Example 1 except for changing the liquid layer.

Incidentally, as for Example 6, glass sheet 1 was used in place of glass sheet 2 as glass sheet B.

Comparative Examples 1 to 4

As glass sheet A, each of glass sheet 1 (comparative Example 1), glass sheet 2 (Comparative Example 2), acrylic resin (Comparative Example 3), and alumina sintered body (Comparative Example 4) was used alone and evaluated for various properties.

Comparative Examples 5 and 6

Glass sheet B was adhered to glass sheet A without using a liquid layer to obtain a glass sheet composite (Comparative Example 5). Also, glass sheet A and glass sheet B were fusion-bonded by heating the glass sheet composite obtained in Comparative Example 5 at 900° C. in an air atmosphere to obtain a glass sheet composite (Comparative Example 6).

Comparative Examples 7 to 10

Glass sheet composites in which glass sheet A and glass sheet B were fixed using various adhesives or films in place of a liquid layer were obtained.

Configurations and evaluation results of glass sheet composites obtained in Examples 1 to 12 are shown in Table 1, and configurations and evaluation results of glass sheet composites obtained in Comparative Examples 1 to 10 are shown in Table 2. In the Tables, $10^{\wedge}-2$ denoted by * indicates a numeric unit of $10^{-2}$.

TABLE 1

| | Liquid Couplant Example | | | | | |
|---|---|---|---|---|---|---|
| | 1 | 2 | 3 | 4 | 5 | 6 |
| Glass sheet A | glass sheet 1 | glass sheet 1 | glass sheet 1 | glass sheet 1 | glass sheet 1 | glass sheet 1 |
| Sheet thickness mm | 0.5 | 0.5 | 0.5 | 0.5 | 0.5 | 0.5 |
| Glass sheet B | glass sheet 2 | glass sheet 2 | glass sheet 2 | glass sheet 2 | glass sheet 2 | glass sheet 2 |
| Sheet thickness mm | 0.5 | 0.5 | 0.5 | 0.5 | 0.5 | 0.5 |
| Couplant | $H_2O$ | glycerin + pure water | glycerin + pure water | glycerin + pure water | propylene glycol | propylene glycol |
| Layer thickness/μm | <5 | <5 | <5 | <5 | <5 | <5 |
| Viscosity coefficient mPa · s | 1.2 | 1.9 | 4.1 | 12 | 48 | 48 |
| Surface tension mN/m | 73 | 68 | 71 | 69 | 36 | 36 |
| Double glass structure | 2 sheets | 2 sheets | 2 sheets | 2 sheets | 2 sheets | 2 sheets |
| Sheet thickness mm | 1.0 | 1.0 | 1.0 | 1.0 | 1.0 | 1.0 |
| Longitudinal wave acoustic velocity m/s | $6.1 \times 10^3$ | $6.1 \times 10^3$ | $6.1 \times 10^3$ | $6.1 \times 10^3$ | $6.1 \times 10^3$ | $6.0 \times 10^3$ |
| Loss coefficient *$10^{\wedge}-2$ | 3.2 | 4.5 | 6.2 | 6.4 | 3.1 | 2.0 |

| | Liquid Couplant Example | | | | | |
|---|---|---|---|---|---|---|
| | 7 | 8 | 9 | 10 | 11 | 12 |
| Glass sheet A | glass sheet 1 | glass sheet 1 | glass sheet 1 | glass sheet 1 | glass sheet 1 | glass sheet 1 |
| Sheet thickness mm | 0.5 | 0.5 | 0.5 | 0.5 | 0.5 | 0.5 |
| Glass sheet B | glass sheet 2 | glass sheet 2 | glass sheet 2 | glass sheet 2 | glass sheet 2 | glass sheet 2 |
| Sheet thickness mm | 0.5 | 0.5 | 0.5 | 0.5 | 0.5 | 0.5 |
| Couplant | ethanol | silicone oil | silicone oil | silicone oil | silicone oil | silicone oil |
| Layer thickness/μm | <5 | <5 | <5 | <5 | <5 | <5 |
| Viscosity coefficient mPa · s | 0.7 | 100 | 500 | 3000 | 10000 | 60000 |
| Surface tension mN/m | 22 | 21 | 21 | 21 | 21 | 21 |
| Double glass structure | 2 sheets | 2 sheets | 2 sheets | 2 sheets | 2 sheets | 2 sheets |
| Sheet thickness mm | 1.0 | 1.0 | 1.0 | 1.0 | 1.0 | 1.0 |
| Longitudinal wave acoustic velocity m/s | $6.0 \times 10^3$ | $6.3 \times 10^3$ | $6.2 \times 10^3$ | $6.2 \times 10^3$ | $6.1 \times 10^3$ | $6.2 \times 10^3$ |
| Loss coefficient *$10^{\wedge}-2$ | 1.6 | 2.0 | 3.1 | 4.1 | 3.9 | 1.7 |

TABLE 2

| | Single Sheet Comparative Example | | | | No Couplant |
|---|---|---|---|---|---|
| | 1 | 2 | 3 | 4 | 5 |
| Glass sheet A | glass sheet 1 | glass sheet 2 | acryl resin | alumina sintered body | glass sheet 1 |
| Sheet thickness mm | 0.5 | 0.5 | 0.5 | 0.5 | 0.5 |
| Glass sheet B | — | — | — | — | glass sheet 2 |
| Sheet thickness mm | — | — | — | — | 0.5 |
| Couplant | single sheet | single sheet | single sheet | single sheet | none |
| Layer thickness/μm | — | — | — | — | — |
| Viscosity coefficient mPa · s | — | — | — | — | — |
| Surface tension mN/m | — | — | — | — | — |

TABLE 2-continued

|  |  |  |  |  |  |
|---|---|---|---|---|---|
| Double glass structure | — | — | — | — | 2 seats |
| Sheet thickness mm | — | — | — | — | 1.0 |
| Longitudinal wave acoustic velocity m/s | $6.1 \times 10^3$ | $6.3 \times 10^3$ | $2.7 \times 10^3$ | $2.0 \times 10^4$ | — |
| Loss coefficient *10^ − 2 | 0.07 | 0.07 | 2.2 | 0.05 | 0.14 |

|  | No Couplant | Solid Couplant Comparative Example | | | |
|---|---|---|---|---|---|
|  | 6 | 7 | 8 | 9 | 10 |
| Glass sheet A | glass sheet 1 | glass sheet 1 | glass sheet 1 | glass sheet 1 | glass sheet 1 |
| Sheet thickness mm | 0.5 | 0.5 | 0.5 | 0.2 | 0.1 |
| Glass sheet B | glass sheet 2 | glass sheet 2 | glass sheet 2 | glass sheet 1 | glass sheet 1 |
| Sheet thickness mm | 0.5 | 0.5 | 0.5 | 0.5 | 0.5 |
| Couplant | fusion-bonded at 900° C. | grease (paraffin) | acrylic adhesive | polyimide | polyimide |
| Layer thickness/μm | — | 8 | <5 | 6 | 25 |
| Viscosity coefficient mPa · s | — | — | — | — | — |
| Surface tension mN/m | — | — | — | — | — |
| Double glass structure | 2 seats | 2 seats | 2 seats | 2 seats | 2 seats |
| Sheet thickness mm | 1.0 | 1.0 | 1.0 | 0.7 | 0.6 |
| Longitudinal wave acoustic velocity m/s | $6.1 \times 10^3$ | $5.9 \times 10^3$ | $6.0 \times 10^3$ | — | $6.0 \times 10^3$ |
| Loss coefficient *10^ − 2 | 0.06 | 0.06 | 0.13 | 0.05 | 0.06 |

In all of glass sheet composites of Examples 1 to 12 having a viscosity coefficient of 0.7 mPa·s to 60 Pa·s and a surface tension of 21 to 73 mN/m, in which the thickness of the liquid layer was less than 5 μm and ¹/₁₀ or less of the total thickness of the pair of glass sheets, the longitudinal wave acoustic velocity in the sheet thickness direction was 6.0× $10^3$ m/s or more, and the loss coefficient at 25° C. was $1.7 \times 10^{-2}$ or more, revealing good properties.

Incidentally, a glass sheet composite in which the combination of glass sheet A and glass sheet B as a pair of glass sheets is a combination of different kinds of glass sheets (glass sheet 1+glass sheet 2) exhibited better vibration damping property than that using a combination of the same kind of glass sheets (glass sheet 1+glass sheet 1) (see, for example, Examples 5 and 6).

On the other hand, in the case of using a single glass sheet or an aluminum sintered body (Comparative Examples 1, 2 and 4), the longitudinal wave acoustic velocity was $6.0 \times 10^3$ m/s or more in all cases, but the loss coefficient at 25° C. was low, $1 \times 10^{-3}$ or less, and the composite was not suited to be a diaphragm. In the case of using an acrylic resin (Comparative Example 3), the loss coefficient at 25° C. was $2.2 \times 10^{-2}$, but the longitudinal wave acoustic velocity was low, $2.7 \times 10^3$ m/s.

In the case of not using a couplant (Comparative Example 5), the loss coefficient at 25° C. was low, $1.4 \times 10^3$, and the acoustic wave could not be sufficiently transmitted between glass substrates, revealing that the composite is not suited to be a diaphragm. In the case of glass sheet A and glass sheet B fuse-bonded at 900° C. (Comparative Example 6), the loss coefficient was low, similar to the single sheet.

In the case of using a solid couplant and setting its film thickness to be 25 μm or less and ¹/₁₀ or less of the total thickness of the pair of glass sheets (Comparative Examples 7 to 10), the loss coefficient was low in all cases, and the composites were not suited to be a diaphragm.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2016-75928) filed on Apr. 5, 2016, Japanese Patent Application (Patent Application No. 2016-174801) filed on Sep. 7, 2016, and Japanese Patent Application (Patent Application No. 2016-228372) filed on Nov. 24, 2016, the contents of which are incorporated herein by way of reference.

INDUSTRIAL APPLICABILITY

The glass sheet composite according to the present invention has a large longitudinal wave acoustic velocity and a high loss coefficient and is therefore suitably usable, for example, as a diaphragm used for loudspeakers, microphones, earphones, mobile devices, etc., as an opening member for buildings•vehicles, and as a glass substrate for magnetic recording mediums.

DESCRIPTION OF REFERENCE NUMERALS AND SIGNS

10 Glass sheet composite
11 Glass sheet A
12 Glass sheet B
13 Glass sheet C
16 Liquid layer
21 Coating
22 Film
30 Frame
31 Seal material

The invention claimed is:

1. A glass sheet composite comprising two or more glass sheets and a liquid layer between at least a pair of glass sheets out of the glass sheets,
   wherein a thickness of the liquid layer is
   ¹/₁₀ or less of a total thickness of the pair of glass sheets when a total thickness of the pair of glass sheets is 1 mm or less, and
   100 μm or less when the total thickness of the pair of glass sheets is more than 1 mm,
   wherein the liquid layer contains at least one member selected from the group consisting of propylene glycol, dimethyl silicone oil, methyl phenyl silicone oil, methyl hydrogen silicone oil, and denatured silicone oil.

2. The glass sheet composite according to claim 1, wherein the liquid layer has a viscosity coefficient at 25° C. of $1\times10^{-4}$ to $1\times10^3$ Pa·s and a surface tension at 25° C. of 15 to 80 mN/m.

3. The glass sheet composite according to claim 1, wherein both of at least a pair of glass sheets out of all the glass sheets have a specific modulus of $2.5\times10^7$ m²/s² or more.

4. The glass sheet composite according to claim 1, wherein out of two glass sheets constituting the pair of glass sheets, denoting Qa and wa respectively as a resonant frequency and a half-width of resonance amplitude of one glass sheet A and denoting Qb and wb respectively as a resonant frequency and a half-width of resonance amplitude of the other glass sheet B, following relationship of [formula 1] is satisfied:

$$(wa+wb)/4 < |Qa-Qb| \quad \text{[formula 1]}.$$

5. The glass sheet composite according to claim 1, wherein a mass ratio of two glass sheets constituting the pair of glass sheets is from 0.8 to 1.25.

6. The glass sheet composite according to claim 1, wherein a sheet thickness of each of two glass sheets constituting the pair of glass sheets is from 0.01 to 15 mm.

7. The glass sheet composite according to claim 1, wherein the glass sheet comprises at least either one of physically strengthened glass sheet or chemically strengthened glass sheet.

8. The glass sheet composite according to claim 1, wherein a visible light transmittance is 60% or more.

9. The glass sheet composite according to claim 1, comprising three or more glass sheets.

10. The glass sheet composite according to claim 1, wherein at least one glass sheet or the liquid layer is colored.

11. The glass sheet composite according to claim 1, wherein the liquid layer contains a fluorescent material.

12. The glass sheet composite according to claim 1, wherein a coating or a film is formed on at least one of the outermost surfaces of the glass sheet composite.

13. The glass sheet composite according to claim 1, wherein the glass sheet composite has a curved surface shape.

14. The glass sheet composite according to claim 1, wherein a difference between a refractive index of the liquid layer and the refractive index of each of the pair of glass sheets is 0.2 or less.

15. The glass sheet composite according to claim 1, wherein at least part of an outer circumferential edge surface of the glass sheet composite is sealed by a member not hindering vibration of the glass sheet composite.

16. A diaphragm comprising the glass sheet composite according to claim 1 and at least one vibrator disposed on one side or both sides of the glass sheet composite.

17. An opening member using the glass sheet composite according to claim 1.

* * * * *